(12) United States Patent
Robin et al.

(10) Patent No.: US 11,880,906 B2
(45) Date of Patent: Jan. 23, 2024

(54) IMAGE DISPLAY SYSTEM AND CONTROL METHOD

(71) Applicant: ALEDIA, Échirolles (FR)

(72) Inventors: Ivan-Christophe Robin, Grenoble (FR); Frédéric Mercier, Saint Nicolas de Macherin (FR); Matthieu Charbonnier, Fontaine (FR)

(73) Assignee: ALEDIA, Échirolles (FR)

( * ) Notice: Subject to any disclaimer, the term of this patent is extended or adjusted under 35 U.S.C. 154(b) by 190 days.

(21) Appl. No.: 17/626,181

(22) PCT Filed: Jul. 9, 2020

(86) PCT No.: PCT/FR2020/051245
§ 371 (c)(1),
(2) Date: Jan. 11, 2022

(87) PCT Pub. No.: WO2021/009451
PCT Pub. Date: Jan. 21, 2021

(65) Prior Publication Data
US 2022/0277410 A1    Sep. 1, 2022

(30) Foreign Application Priority Data

Jul. 12, 2019 (FR) ...................................... 1907893

(51) Int. Cl.
*G06F 3/01* (2006.01)
*G06T 1/20* (2006.01)
*G06T 1/60* (2006.01)

(52) U.S. Cl.
CPC ................. *G06T 1/20* (2013.01); *G06T 1/60* (2013.01)

(58) Field of Classification Search
CPC .......... G06F 3/012; G06F 3/011; G06F 3/013; G06F 1/163; G06F 3/147; G06F 3/04815;
(Continued)

(56) References Cited

U.S. PATENT DOCUMENTS 10,398,976 B2 * 9/2019 Lim .................. G02B 27/0172
2015/0002542 A1 1/2015 Chan et al.
(Continued)

OTHER PUBLICATIONS

International Search Report dated Oct. 7, 2020 re: Application No. PCT/FR2020/051245, pp. 1-2, citing: US 20150379772 A1, US 20180365882 A1, US 20150002542 A1, US 20180182273 A1 and US 20170228015 A1.

*Primary Examiner* — Hau H Nguyen
(74) *Attorney, Agent, or Firm* — CANTOR COLBURN LLP

(57) ABSTRACT

An image display system includes at least one user parameter analyser configured to determine at least one parameter associated with a user, an image display screen having luminous pixels, at least one graphics processing unit configured to process at least one first main image that can be displayed on the image display screen and that is representative of a first zone of a main scene. The system further includes at least one image buffer device configured to store at least the first main image, and a graphics controller configured to control a display of at least one first secondary image on the image display screen, the first secondary image having a first portion of the first main image included in the first main image and positioned within the first main image as a function of a first user parameter.

8 Claims, 2 Drawing Sheets

(58) Field of Classification Search
CPC ........... G06T 19/006; G06T 7/70; G06T 1/20; G06T 7/20; G06T 7/579; G09G 3/007; G09G 2320/0266; G09G 2340/0464; G09G 2320/028

See application file for complete search history.

(56) References Cited

U.S. PATENT DOCUMENTS

| | | |
|---|---|---|
| 2015/0379772 A1 | 12/2015 | Hoffman |
| 2017/0228015 A1 | 8/2017 | Russell |
| 2018/0182273 A1 | 6/2018 | Hwang et al. |
| 2018/0365882 A1 | 12/2018 | Croxford et al. |

* cited by examiner

IMAGE DISPLAY SYSTEM AND CONTROL METHOD

TECHNICAL FIELD

The present disclosure concerns an image viewing system.

The disclosure also concerns a method for controlling an image viewing system.

The disclosure also concerns a virtual reality mask including an image viewing system.

BACKGROUND

In the field of virtual reality masks, it is known that a too high latency between the movement of the head and the display of the corresponding image generates a feeling of discomfort to a user of the virtual reality mask during his movements.

A known solution consists in increasing the refresh rate of the images. However, this solution consumes a lot of energy and limits the electrical autonomy of use. The required calculators are furthermore expensive, which financially undermines the attractiveness of the solution.

Another known solution consists in making the images flash and displaying them only part of the time, for example with a ratio of 10%, the rest of the perceived image being interpolated by the user's brain. In addition to the lack of precision of the images thus produced, this causes a significant drop in the brightness of the images.

SUMMARY

The present disclosure provides a solution for viewing images, in particular virtual reality images, making it possible to address all or part of the problems presented above.

In particular, to the disclosure provides a solution meeting at least one of the following advantages:
 obtain a satisfactory responsiveness of the images display;
 obtain a suitable light intensity of the images display;
 obtain an admissible electrical autonomy of the image viewing systems;
 provide a solution that remains economical.

This could be achieved by providing an image viewing system, including at least one user parameter analyzer configured to determine at least one parameter associated with a user of the image viewing system; an image display screen including a plurality of light pixels distributed in a matrix manner; at least one graphics calculator configured to calculate at least one first main image that could be viewed at least partially on the image display screen and representative of a first area of a main scene; at least one image buffer device configured to store at least the first main image calculated by the graphics calculator; a graphics controller capable of communicating with the image buffer device and configured to control a display of at least one first secondary image on the image display screen, the first secondary image being constituted by a first portion of the first main image included entirely in the first main image and positioned within the first main image based on at least one first user parameter determined by the user parameter analyzer, the graphics controller being configured to control the display on the image display screen of a second secondary image replacing the first secondary image, the second secondary image being constituted by a second portion of the main image, included entirely in the first main image and shifted within the first main image relative to the first secondary image according to at least one second parameter of the user determined by the user parameter analyzer following a first movement of the user;

the graphics controller comprising at least one first pixel buffer device connected to a first pixel of the image display screen, the first pixel buffer device being configured to communicate with a second pixel buffer device connected to a second pixel of the image display screen, the first pixel buffer device being configured to store a first set of information relating to the first pixel, the second pixel buffer device being configured to store a second set of information relating to the second pixel, the first pixel buffer device being able to receive the second set of information from the second pixel buffer device and the second set of information replacing the first set of information within the first pixel buffer device when the image display screen switches from displaying the first secondary image to the second secondary image.

Some preferred yet non-limiting aspects of the image viewing system are as follows.

In one implementation of the image viewing system, the first main image comprises a first dimension $x_1$ and a second dimension $y_1$ corresponding respectively to first and second numbers of light pixels of the screen and considered respectively along a first axis X and a second axis Y of the first main image perpendicular to each other, and wherein the second secondary image is determined at least by shifting the first secondary image, within the first main image, by a first amount of pixels $\Delta_1$ along the axis X and a second amount of pixels $\Delta_2$ along the axis Y, the first amount of pixels $\Delta_1$ and the second amount of pixels $\Delta_2$ being determined by the graphics calculator as a function of at least the second user parameter, the first amount of pixels $\Delta_1$ and the second amount of pixels $\Delta_2$ being such that $\Delta_1/x_1 < 50\%$ and $\Delta_2/y_1 < 50\%$.

In one implementation of the image viewing system, the information of the first set of information relating to the first pixel is representative of a first color and/or of a first light intensity to be displayed by the first pixel, and wherein the information of the second set of information relating to the second pixel is representative of a second color and/or of a second light intensity to be displayed by the second pixel.

In an implementation of the image viewing system, at least one element selected from the group comprising the first pixel buffer device and the second pixel buffer device is configured to communicate with a digital to analog converter capable of converting a digital message, coming from an element selected from the group comprising the first pixel buffer device and the second pixel buffer device, into a voltage or into an electric current powering respectively the first pixel or the second pixel.

In an implementation of the image viewing system, at least one user parameter selected from the group comprising the first, second and third user parameters, comprises at least one piece of information selected from a movement of the user, a position of the user's head, a main direction of view of the user and a field of view of the user.

The disclosure also relates to the implementation of a method for controlling an image viewing system wherein the image viewing system includes at least one user parameter analyzer configured to determine at least one parameter associated with a user of the image viewing system; an image display screen having a plurality of light pixels distributed in a matrix manner; a graphics controller capable of communicating with an image buffer device and configured to control a display of images on the image display screen; the graphics controller comprising at least one first pixel buffer device connected to a first pixel of the image display screen, the first pixel buffer device being configured to communicate with a second pixel buffer device connected to a second pixel of the image display screen, the first pixel buffer device being configured to store a first set of information relating to the first pixel, the second pixel buffer device being configured to store a second set of information relating to the second pixel;

the method comprising the following steps:

a) determining at least one first user parameter by the user parameter analyzer;

b) determining, by at least one graphics calculator, at least one first main image that could be displayed at least partially on the image display screen, where the first main image corresponds to a first area of the main scene;

c) storing the first main image calculated by the graphics calculator in the image buffer device;

d) controlling, by the graphics controller, the display by the image display screen of a first secondary image comprising a first portion of the first main image included entirely in the first main image and positioned within the first main image based on at least the first user parameter;

e) determining, by the user parameter analyzer, at least one second user parameter following a first movement of the user;

f) controlling, by the graphics controller, the display on the image display screen of a second secondary image replacing the first secondary image in the image display screen, the second secondary image being constituted by a second portion of the first main image, included entirely in the first main image, and shifted within the first main image with respect to the first secondary image as a function of at least the second parameter of the user;

the first pixel buffer device being able to receive the second set of information from the second pixel buffer device and the second set of information replacing the first set of information within the first pixel buffer device when the image display screen switches from displaying the first secondary image to the second secondary image.

Some preferred yet non-limiting aspects of the control method are as follows:

In an implementation of the method, the first main image comprises a first dimension $x_1$ and a second dimension $y_1$ corresponding respectively to first and second numbers of light pixels of the screen and considered respectively along a first axis X and a second axis Y considered on the main image perpendicular to each other, the method including the following step, implemented prior to step f):

g) determining, by the graphics calculator, as a function of the second user parameter:

a first amount of pixels $\Delta_1$ along the axis X, the first secondary image and the second secondary image being shifted by the first amount of pixels $\Delta_1$ within the main image, and a second amount of pixels $\Delta_2$ along the axis Y, the first secondary image and the second secondary image being shifted by the second amount of pixels $\Delta_1$ within the main image, the first amount of pixels $\Delta_1$ and the second amount of pixels $\Delta_1$ being such that $\Delta_1/x_1<50\%$ and $A_2/y_1<50\%$.

The disclosure also relates to a virtual reality mask comprising such an image viewing system.

BRIEF DESCRIPTION OF THE DRAWINGS

Other aspects, aims, advantages and features of the disclosure will appear better on reading the following detailed description of preferred embodiments thereof, provided as a non-limiting example, and made with reference to the appended drawings in which.

DETAILED DESCRIPTION OF THE DRAWINGS

Figure 1:
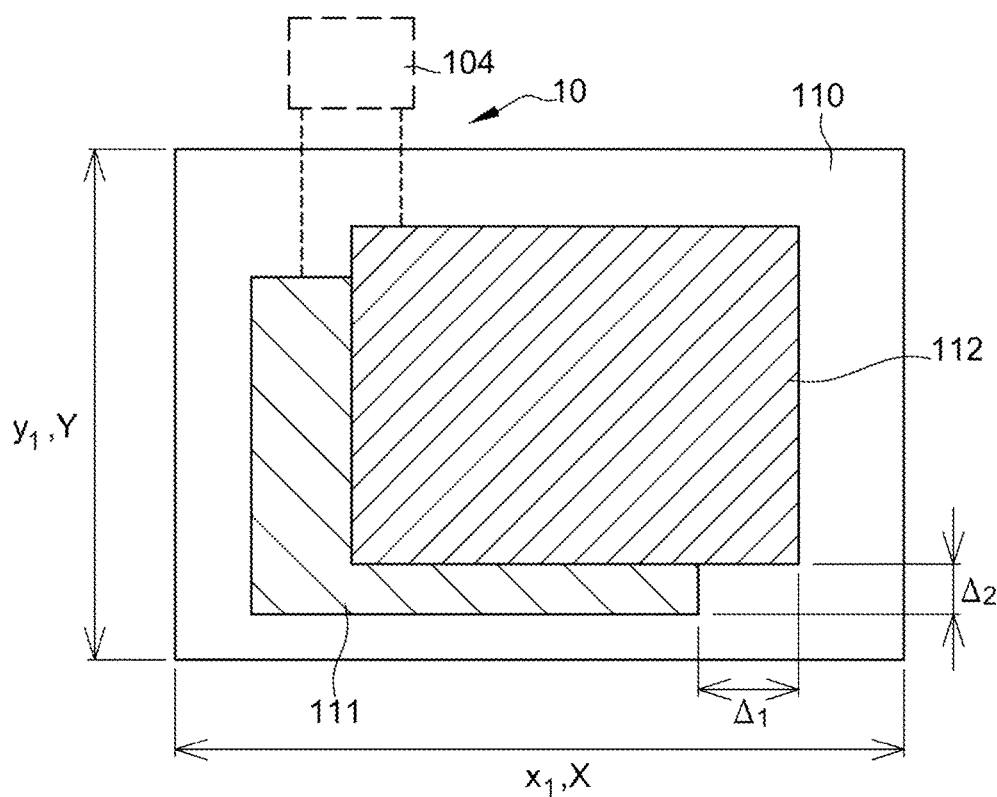
FIG. 1 is a schematic view of a main image comprising a first secondary image and a second secondary image.

In the appended FIGS. 1 to 4 and in the remainder of the description, elements that are functionally identical or similar are identified by the same reference numerals. In addition, the different elements are not represented to scale so as to enhance clarity of the figures to facilitate understanding. Moreover, the different embodiments and variants do not exclude one another and may, on the contrary, be combined together.

In the remainder of the description, unless indicated otherwise, the terms "substantially", "about", "generally" and "in the range of" mean "within 10%".

Figure 2:
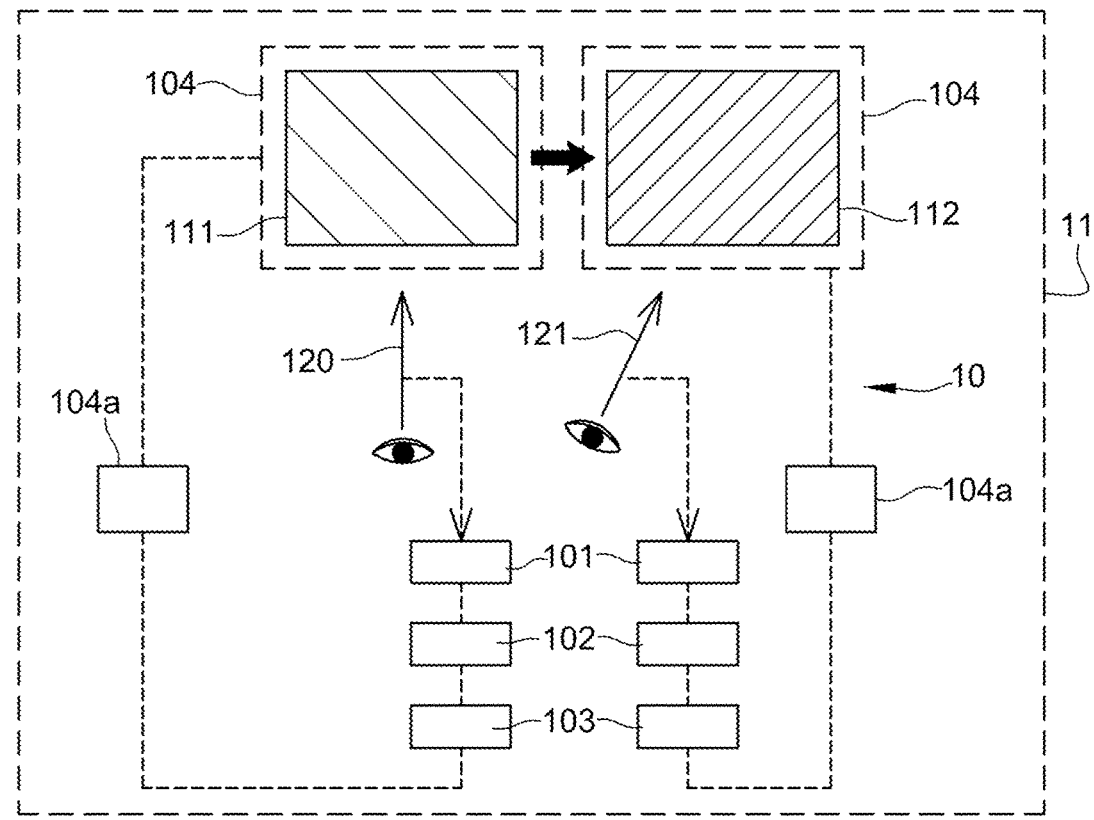
FIG. 2 is a schematic view of an embodiment of an image viewing system according to the disclosure.
Figure 3:
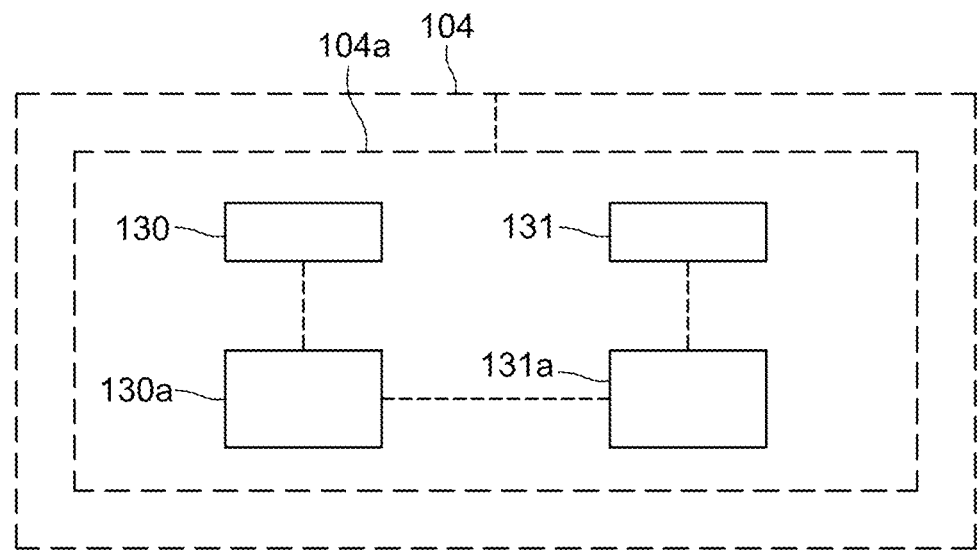
FIG. 3 is a schematic view of an embodiment of a graphics controller of the image viewing system.

The disclosure relates first of all to an image viewing system 10, illustrated at least partially in FIGS. 1 to 3, including at least one user parameter analyzer 101. The user parameter analyzer 101 is configured to determine at least one parameter associated with a user of the image viewing system 10. The parameters associated with the user comprises at least of one piece of information selected from a movement of the user and/or a position of the head and/or the eyes of the user and/or a main direction of vision of the user and/or a field of vision of the user. The user parameter analyzer 101 may comprise movement sensors such as accelerometers or gyroscopes. The user parameter analyzer 101 may comprise means for determining a main direction of vision of the user or else a field of vision of the user such as cameras, for example cameras operating in the infrared domain coupled with light sources adapted to infrared. The term "main direction of vision" refers to the direction in which the user is clearly looking. The field of vision represents the visual assembly perceived by the eyes of the user in a clear or more blurred way, it represents an angle of approximately 180° around the orientation of the eyes. In general, the portion of clear vision of a typical user corresponds to approximately twenty degrees according to the orientation of the eyes of the user. It may therefore be important to determine within a few degrees the main direction of vision of the user in order to be able to present to him by feedback display an adapted corresponding image.

The image viewing system 10 also comprises an image display screen 104 having a plurality of light pixels distributed according to a matrix. The light pixels are controlled to represent images. Those skilled in the art will be able to implement their classical knowledge to obtain these light pixels and the associated basic circuits.

The image viewing system 10 also comprises at least one graphics calculator 102 configured to calculate at least one first main image 110. The graphics calculator 102 is for example called "Graphics Processing Unit". The graphics calculator 102 may for example comprise microprocessors. The first main image 110 could be viewed at least partially "on" or equivalently "in" or "by" the image display screen 104. The first main image 110 is, for example, representative of a first area of a main scene. The main scene represents, for example, a static or moving environment, virtual or not, in which the user could evolve virtually. The user may thus move in a static manner, for example by moving only his eyes or his head or by performing movements involving the whole body. For example, by moving the head strongly, the user should be able to visualize a change from a first to a second area different from the main scene as he/she could perform in reality. In another example, by moving the head slightly, the user should be able to visualize a slight change in the same area of the main scene. In order to calculate the images corresponding to the different slight or large movements of the user with satisfactory fluidity without loss of luminosity and without delay, it may be advantageous to use the architecture detailed below.

Thus, the image viewing system 10 also comprises at least one image buffer device 103 configured to store at least the first main image 110 calculated by the graphics calculator 102. For example, the image buffer device 103 comprises one or several rewritable memories of FLASH, RAM or equivalent types.

The image buffer device 103 communicates with a graphics controller 104a. Thus, the graphics controller 104a may use and process data, for example from the first main image 110 or from a second main image 210, temporarily stored in the image buffer device 103. The graphics controller 104a comprises for example calculation means such as microprocessors. As illustrated in FIGS. 1 and 2, the graphics controller 104a is configured to control a display of at least one first secondary image 111 on the image display screen 104.

The first secondary image 111 is a first portion of the first main image 110 included entirely in the first main image 110. The first secondary image 111 is positioned within the first main image 110 as a function of at least one first parameter of the user 120 determined by the user parameter analyzer 101. The first secondary image 111 thus corresponds, for example, to the image of the main scene viewed in the main direction of vision of the user.

It is advantageous to calculate a first main image 110 larger than the first secondary image 111 which is displayed on the image display screen 104. Indeed, the calculation rates by conventional graphics calculators or those with low power consumption are lower than the display rates on the image display screen 104. Thus, by calculating a first or a second main image 110, 210 larger than the secondary images 111, 112, it is then possible to deduce therefrom directly, or with simplified calculations, carried out by the graphics controller 104a, several secondary images 111, 112 which will be displayed more quickly than if they had to be recalculated entirely separately.

In its standard operating mode, the graphics calculator 102 provides images of the main scene in the user's main direction of vision at a frequency defined by the system (e.g., 60 Hz, 120 Hz). A first main image 110 calculated by the graphics calculator 102 is thus provided. The portion of the first main image 110 viewed by the user is the first secondary image 111 extracted by the graphics controller 104a. A second main image 210 will be provided after the period defined by the frequency of the system and will correspond to the refreshed scene taking into account the updated main direction of vision of the user. While waiting for the image 210 and based on the user parameter analyzer 101, a second secondary image 112 is displayed to the user corresponding to his current main direction of vision 121. This second secondary image 112 is obtained by a simple shift within the first main image 110, or by applying simple algorithms to this image 110. The system therefore makes it possible to maintain the illusion of the user's movement between the two successive main images 110, 210. This system offers a significant gain in energy consumption and system resources necessary for the calculation of the images compared to a solution where the calculator 102 would supply the images at a rate where the secondary images 111, 112 would no longer be necessary. On the other hand, the secondary images 111, 112 thus generated allow the total or partial replacement of the insertion of black images thereby advantageously increasing the brightness of the screen.

A single first secondary image 111 and a single secondary image 112 replacing the first secondary image 111 are considered herein. However, there may be many secondary images constructed in a main image 110, 210 as long as they are included entirely in the concerned main image 110, 210.

In an implementation of the shift between the first secondary image 111 and the second secondary image 112 within the main image 110, a first main image 110 is considered comprising a first dimension $x_1$ and a second dimension $y_1$ expressed in pixels or, in other words, corresponding respectively to first and second numbers of light pixels of the display screen. The first and second dimensions $x_1$ and $y_1$ are considered respectively along a first axis X and a second axis Y of the first main image 110, perpendicular to each other. The second secondary image 112 is thus determined, by the graphics calculator 102 or the graphics controller 104a from the data stored in the image buffer device 103, at least by shifting the first secondary image 111, within the first main image 110, by a first amount of pixels $\Delta_1$ along the axis X and by a second amount of pixels $\Delta_2$ along the axis Y. This could be seen in FIG. 1. The first amount of pixels $\Delta_1$ and the second amount of pixels $\Delta_2$ also advantageously meet the following constraints $\Delta_1/x_1 < 50\%$ and $\Delta_2/y_1 < 50\%$. The compliance with these provisions is very advantageous to optimize electrical autonomy.

In the following paragraph, the graphics controller 104a comprises features that may be implemented in an image viewing system 10 of the disclosure but may also be implemented independently.

As illustrated in FIG. 3, the graphics controller 104a comprises, in one example, at least one first pixel buffer device 130a connected to a first pixel 130 of the image display screen 104. The first pixel buffer device 130a is configured to communicate with a second pixel buffer device 131a itself connected to a second pixel 131 of the image display screen 104. The first pixel buffer device 130a is configured to store a first set of information relating to the first pixel 130. The second pixel buffer device 131a is also configured to store a second set of information relating to the second pixel 131. The first pixel buffer device 130a could further receive the second set of information from the second pixel buffer device 131a and that being so in a bidirectional fashion. The second set of information replaces the first set of information within the first pixel buffer device 130a when the image display screen 104 switches from displaying the first secondary image 111 to the second secondary image 112. This architecture is advantageous to improve the display latency time. Indeed, the transmission of the sets of information, calculated beforehand, takes place step-by-step following one single signal. This architecture is particularly advantageous in combination with the calculation of the secondary images 111, 112 which requires a low display latency.

In one example, the first set of information relating to the first pixel 130 corresponds to a first color and/or a first light intensity to be displayed by the first pixel 130. In the same example, the second set of information relating to the second pixel 131 corresponds to a second color and/or a second light intensity to be displayed by the second pixel 131. The pixel buffer devices 130a, 131a are for example composed of one or several volatile memories.

Figure 4:
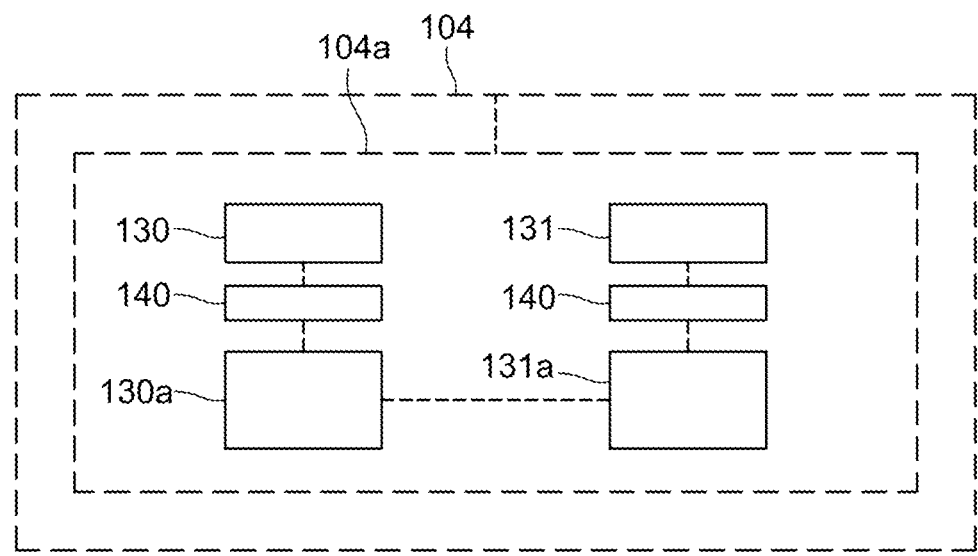
FIG. 4 is a schematic view of an embodiment of a graphics controller of the image viewing system.

In an example illustrated in FIG. 4, the first pixel buffer device 130a and/or the second pixel buffer device 131a are configured to communicate with one or several digital to analog converters 140 also called DACs "Digital Analogic Converter". The digital-to-analog converters 140 could convert a digital message, coming from the first pixel buffer device 130a and/or from the second pixel buffer device 131a, into a voltage or an electric current respectively powering the first pixel 130 or the second pixel 131.

The disclosure also concerns a method for controlling an image viewing system 10, in particular like the previously-described one. This method could be viewed in FIG. 2. The method comprises the following steps:

a) determining at least one first user parameter 120 by the user parameter analyzer 101;

b) determining, by at least one graphics calculator 102, at least one first main image 110 that could be viewed at least partially on the image display screen 104, the first main image 110 corresponding to a first area of a main scene;

c) storing the first main image 110 calculated by the graphics calculator 102 in the image buffer device 103;

d) controlling, by the graphics controller 104a, the display by the image display screen 104 of the first secondary image 111, the first secondary image 111 being a first portion of the first main image 110 included entirely in the first main image 110 and positioned within the first main image 110 as a function of at least the first parameter of the user 120.

This method is advantageous because it makes it possible to reduce the latency between the display and the movement of the user.

The method also includes the following additional steps:

e) determining, by the user parameter analyzer 101, following a first movement of the user, at least one second parameter of the user 121;

f) controlling, by the graphics controller 104a, the display on the image display screen 104 of a second secondary image 112, replacing the first secondary image 111 in the images display screen 104.

The second secondary image 112 is a second portion of the first main image 110, entirely included in the first main image 110, and shifted within the first main image 110 relative to the first secondary image 111 according to at least the second parameter of the user 121.

This is advantageous because during a movement of low amplitude of the user then the secondary images are sufficient to follow for example the main direction of vision of the user, and this, without having to recalculate a second main image 210. The electrical autonomy is increased and the computing power requirements are limited, which therefore lowers hardware costs.

In one implementation, the first main image 110 comprises a first dimension $x_1$ and a second dimension $y_1$ expressed in pixels, or in other words, corresponding respectively to first and second numbers of light pixels. The first dimension $x_1$ and second dimension $y_1$ are considered respectively along a first axis X and a second axis Y considered on the main image 110 and perpendicular to each other. The method then includes a step g) of determination, by the graphics calculator 102, as a function of the second parameter of the user 121, a first amount of pixels $\Delta_1$ along the axis X. Step g) is implemented prior to step f).

The first secondary image 111 and the second secondary image 112 are shifted by this first amount of pixels $\Delta_1$ within the main image 110. Step g) also consists in the determination by the graphics calculator 102 of a second amount of pixels $\Delta_2$ along the axis Y. The first secondary image 111 and the second secondary image 112 are shifted by the second amount of pixels $\Delta_2$ within the main image 110. The first amount of pixels $\Delta_1$ and the second amount of pixels $\Delta_2$ also meet the following constraints $\Delta_1/x_1 < 50\%$ and $\Delta_2/y_1 < 50\%$. These constraints are advantageous to make it possible to obtain an improved electrical autonomy and to reduce the cost of the computing hardware.

The disclosure also concerns a virtual reality mask 11 including an image viewing system 10 as described above. FIGS. 2 and 3 illustrate such a virtual reality mask 11. A virtual reality mask 11 thus configured has an increased electric autonomy and a satisfactory display rate for the comfort of the user wearing it, all that for a reduced price.

The invention claimed is:

1. An image viewing system, including:

at least one user parameter analyzer configured to determine at least one parameter associated with a user of the image viewing system;

an image display screen including a plurality of light pixels distributed in a matrix manner;

at least one graphics calculator configured to calculate at least one first main image that could be viewed at least partially on the image display screen and representative of a first area of a main scene;

at least one image buffer device configured to store at least the first main image calculated by the graphics calculator;

a graphics controller capable of communicating with the image buffer device and configured to control a display of at least one first secondary image on the image display screen, the first secondary image being constituted by a first portion of the first main image included entirely in the first main image and positioned within the first main image according to at least one first parameter of the user determined by the user parameter analyzer;

the graphics controller being configured to control the display on the image display screen of a second secondary image replacing the first secondary image, the second secondary image being constituted by a second portion of the main image, included entirely in the first main image and shifted within the first main image with respect to the first secondary image based on at least one second parameter of the user determined by the user parameter analyzer following a first movement of the user;

the graphics controller comprising at least one first pixel buffer device connected to a first pixel of the image display screen, the first pixel buffer device being configured to communicate with a second pixel buffer device connected to a second pixel of the image display screen, the first pixel buffer device being configured to store a first set of information relating to the first pixel, the second pixel buffer device being configured to store a second set of information relating to the second pixel, the first pixel buffer device being capable of receiving the second set of information from the second pixel buffer device and the second set of information replacing the first set of information within the first pixel buffer device when the image display screen switches from displaying the first secondary image to the second secondary image.

2. The image viewing system according to claim 1, wherein the first main image comprises a first dimension ($x_1$) and a second dimension ($y_1$) corresponding respectively to first and second numbers of pixels of the screen and considered respectively along a first axis (X) and a second axis (Y) of the first main image perpendicular to each other, and wherein the second secondary image is determined at least by shifting the first secondary image, within the first main image, by a first amount of pixels ($\Delta_2$) along the axis (X) and by a second amount of pixels ($\Delta_2$) along the axis (Y), the first amount of pixels ($\Delta_1$) and the second amount of pixels ($\Delta_2$) being determined by the graphics calculator as a function of at least the second parameter of the user, the first amount of pixels ($\Delta_1$) and the second amount of pixels being such that $\Delta_1/x_1 < 50\%$ and $\Delta_2/y_1 < 50\%$.

3. The image viewing system according to claim 1, wherein the information of the first set of information relating to the first pixel is representative of a first color and/or of a first light intensity to be displayed by the first pixel, and wherein the information of the second set of information relating to the second pixel is representative of a second color and/or a second light intensity to be displayed by the second pixel.

4. The image viewing system according to claim 3, wherein at least one element selected from the group comprising the first pixel buffer device and the second pixel buffer device is configured to communicate with a digital to analog converter capable of converting a digital message, coming from an element selected from the group comprising the first pixel buffer device and the second pixel buffer device, into a voltage or into an electric current powering respectively the first pixel or the second pixel.

5. The image viewing system according to claim 1, wherein at least one user parameter selected from the group comprising the first and second user parameters, includes at least of information selected from a movement of the user, a position of the user's head, a main direction of vision of the user and a field of vision of the user.

6. A virtual reality mask including an image viewing system according to claim 1.

7. A method for controlling an image viewing system wherein the image viewing system includes:

at least one user parameter analyzer configured to determine at least one parameter associated with a user of the image viewing system;

an image display screen having a plurality of light pixels distributed in a matrix manner;

a graphics controller capable of communicating with an image buffer device and configured to control a display of images on the image display screen;

the graphics controller comprising at least one first pixel buffer device connected to a first pixel of the image display screen, the first pixel buffer device being configured to communicate with a second pixel buffer device connected to a second pixel of the image display screen, the first pixel buffer device being configured to store a first set of information relating to the first pixel, the second pixel buffer device being configured to store a second set of information relating to the second pixel;

the method including the following steps:

a) determining at least one first parameter of the user by the user parameter analyzer;

b) determining, by at least one graphics calculator, at least one first main image capable of being displayed at least partially on the image display screen, where the first main image corresponds to a first area of a main scene;

c) storing the first main image calculated by the graphics calculator in the image buffer device;

d) controlling, by the graphics controller, the display by the image display screen, of a first secondary image comprising a first portion of the first main image included entirely in the first main image and positioned within the first main image based on at least the first parameter of the user;

e) determining, by the user parameter analyzer, at least one second parameter of the user following a first movement of the user;

f) controlling, by the graphics controller, the display on the image display screen of a second secondary image replacing the first secondary image in the image display screen, the second secondary image being constituted by a second portion of the first main image, included entirely in the first main image, and shifted within the first main image to the first secondary image based on at least the second parameter of the user;

the first pixel buffer device being capable of receiving the second set of information from the second pixel buffer device and the second set of information replacing the first set of information within the first pixel buffer device when the image display screen switches from displaying the first secondary image to the second secondary image.

8. The method of claim 7, wherein the first main image comprises a first dimension ($x_1$) and a second dimension ($y_1$) corresponding respectively to first and second numbers of light pixels of the screen and considered respectively along a first axis (X) and a second axis (Y) considered on the main image perpendicular to each other, the method including the following step, implemented prior to step f):

g) determining, by the graphics calculator, as a function of the second parameter of the user:

a first amount of pixels ($\Delta_1$) along the axis (X), the first secondary image and the second secondary image being shifted by the first amount of pixels ($\Delta_1$) within the main image, and a second amount of pixels ($\Delta_2$) along the axis (Y), the first secondary image and the second secondary image being shifted by the second amount of pixels ($\Delta_2$) within the main image, the first amount of pixels ($\Delta_1$) and the second amount of pixels ($\Delta_2$) being such that $\Delta_1/x_1 < 50\%$ and $\Delta_2/y_1 < 50\%$.

* * * * *